R. DONALD.
METHOD OF STORING MICROSCOPE SLIDES.
APPLICATION FILED AUG. 14, 1917.

1,241,354.

Patented Sept. 25, 1917.

Witnesses
Jas. K. McCathran
David P. Wagner

Inventor
Robert Donald,
By E. G. Siggers
Atty.

UNITED STATES PATENT OFFICE.

ROBERT DONALD, OF HIGHGATE ROAD, LONDON, ENGLAND.

METHOD OF STORING MICROSCOPE-SLIDES.

1,241,354.  Specification of Letters Patent.  Patented Sept. 25, 1917.

Application filed August 14, 1917. Serial No. 186,206.

*To all whom it may concern:*

Be it known that I, ROBERT DONALD, a subject of His Majesty the King of England, and resident of Highgate Road, in the county of London, Kingdom of England, have invented a certain new and useful Method of Storing Microscope-Slides, of which the following is a specification.

This invention concerns means whereby preparations made for examination by the microscope and accordingly mounted on glass slides may be safely stored in an almost solid pack that has the convenience of a card index.

Preparations for examination by the microscope are usually mounted each near the middle of a glass slide about 7.5×2.5 cm. and covered with a cover-glass one to two tenths of a millimeter thick. Such mounted preparations are usually labeled with thin paper labels, thinner than the cover glass. Such mounted slides are usually stored either in individual compartments or else in packs. The individual compartment methods demand much space—about half a dozen times the bulk of the slides themselves—and do not allow the intervening slides to automatically adjust themselves, when several slides are transferred from near the end of a filled box of slides to near the beginning of the box, but necessitate that all the intervening slides shall be individually shifted. Moreover, storage in horizontal compartments, while it leaves the slides inspectable by a glance yet allows the slides to rattle vertically in transit, at the risk of damaging the preparations. Storage in vertical slots prevents harmful rattling, but prevents also inspection by a glance, unless at the waste of much space. The method of laying the slides on top of one another in packs allows rapid inspection but subjects the prominent cover-glass area to pressure and to scratching.

According to the present invention the slides are provided with separating pieces of paper or the like thicker than the height of the cover glass mounted on the slide, so that the slides thus protectively separated may be stored in a box or a drawer with a gangway or gangways of suitable width to accommodate the slides, placed preferably on end and arranged like cards in a card index.

The invention is illustrated in, and hereinafter described with reference to, the accompanying drawings in which:—

Figure 1:
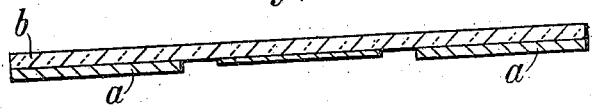
Figure 1 is a sectional view of a microscope slide having a plurality of separating pieces arranged thereon.
Figure 2:
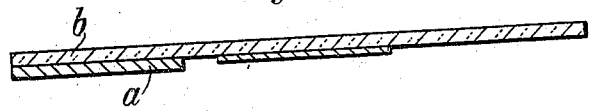
Fig. 2 is a similar view showing a slide having a single separating piece.
Figure 3:
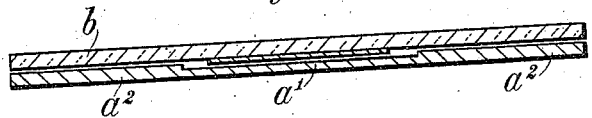
Fig. 3 illustrates a further modified arrangement.

The separating pieces $a$ may be either attached to the slide $b$ at each end, as in Fig. 1, or at one end, as in Fig. 2, and usable as labels, or may be formed of strips of card or the like $a'$ made suitably thicker at each end $a^2$ as in Fig. 3 or at one end only, these latter strips $a'$ $a^2$ to be placed alternately with the slides.

The gangway partitions of the box or drawer in which the slides are stored may be of such height as may allow the floor of the gangway to be reached conveniently with the fore finger.

The stop or stop block used to keep the slides at a convenient slope during the filling or the inspection of a gangway, may be of any suitable pattern in common use and during transit it may have one face firmly supporting the slides and kept vertical by any ordinary device.

The under surface of the box lid if any, may be suitably padded to prevent vertical movement of the slides in transit. It should be understood that no claim is made to the gangwayed box, except for use in connection with the storing of my improved microscope slides.

What I claim is:—

1. A microscope slide provided with separating strips at both of its ends, said strips being attached to the slide and of a thickness greater than that of the mounted preparation on the slide, thereby enabling the slide to be safely stored.

2. A microscope slide provided with a separating strip at one of its ends, said strip being attached to the slide and of a thickness greater than that of the mounted preparation on the slide, thereby enabling the slide to be safely stored.

3. The combination, with a microscope slide having a mounted preparation thereon, of an independent separating strip having one of its ends thickened and of greater thickness than that of the mounted preparation, whereby the slide can be safely stored with others.

4. The combination with a microscope slide having a mounted preparation thereon, of an independent separating strip having both of its ends thickened and of greater thickness than that of the mounted preparation, whereby the slide can be safely stored with others.

5. A microscope slide comprising a slide of glass, a preparation mounted on said slide and protected by a cover glass, and one or more separating strips attached to or disposed in front of one or both ends of the slide and of a thickness greater than said cover glass, so that the complete slide can be safely stored without injury to the cover glass and preparation.

In testimony whereof I have hereunto signed my name.

ROBERT DONALD.

Copies of this patent may be obtained for five cents each, by addressing the "Commissioner of Patents, Washington, D. C."